(12) United States Patent
Navaliger et al.

(10) Patent No.: US 10,570,859 B2
(45) Date of Patent: *Feb. 25, 2020

(54) HOOD OF A MULTI CYCLONE BLOCK OF AN AIR CLEANER AND AIR CLEANER

(71) Applicant: MANN+HUMMEL GmbH, Ludwigsburg (DE)

(72) Inventors: Anand Navaliger, Bangalore (IN); Anil Kumar Henchinamane Channabasappa, Bhadravathi (IN); Kannimuthu Rajamanickam Vinoth Kumar, Bangalore (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 155 days.

This patent is subject to a terminal disclaimer.

(21) Appl. No.: 15/688,117

(22) Filed: Aug. 28, 2017

(65) Prior Publication Data
US 2018/0010556 A1    Jan. 11, 2018

Related U.S. Application Data

(63) Continuation of application No. 14/725,813, filed on May 29, 2015, now Pat. No. 9,745,924.

(51) Int. Cl.
| | |
|---|---|
| *F02M 35/02* | (2006.01) |
| *B04C 3/06* | (2006.01) |
| *B01D 45/16* | (2006.01) |
| *F02M 35/022* | (2006.01) |
| *B04C 3/04* | (2006.01) |
| *B01D 46/24* | (2006.01) |
| *B01D 50/00* | (2006.01) |
| *F02M 35/08* | (2006.01) |

(52) U.S. Cl.
CPC ......... *F02M 35/0201* (2013.01); *B01D 45/16* (2013.01); *B01D 46/2411* (2013.01); *B01D 50/002* (2013.01); *B04C 3/04* (2013.01); *B04C 3/06* (2013.01); *F02M 35/0202* (2013.01); *F02M 35/0216* (2013.01); *F02M 35/0223* (2013.01); *F02M 35/08* (2013.01)

(58) Field of Classification Search
CPC .... B01D 45/12; B01D 45/16; F02M 35/0201; F02M 35/0216; F02M 35/0223; F02M 35/10262; B04C 3/06
See application file for complete search history.

(56) References Cited

U.S. PATENT DOCUMENTS

| | | | |
|---|---|---|---|
| 9,745,924 B2* | 8/2017 | Navaliger | F02M 35/0201 |
| 2013/0305930 A1* | 11/2013 | Oh | B01D 46/0002 |
| | | | 96/385 |

* cited by examiner

*Primary Examiner* — Jason M Greene
(74) *Attorney, Agent, or Firm* — James Hasselbeck

(57) ABSTRACT

The present invention relates to a hood (40) of a multi cyclone block (12) and an air cleaner (10). The cyclone block (12) has a plurality of cyclone cells (28). The hood (40) having at least one hood-inlet (50) and at least one hood-outlet (52) for air to be fed to the cyclone cells (28). The at least one hood-outlet (52) is designed for surrounding, a plurality of cell-inlets (36) of the cyclone cells (28) of the cyclone block (12). A wall (70) of the hood (40) defines a distributor volume (72) inside the hood (40), which is located between the at least one hood-inlet (50) and the at least one hood-outlet (52). The wall (70) has at least one line or area of inflection (74), where at least one inner surface of the wall (70) changes its curvature.

12 Claims, 7 Drawing Sheets

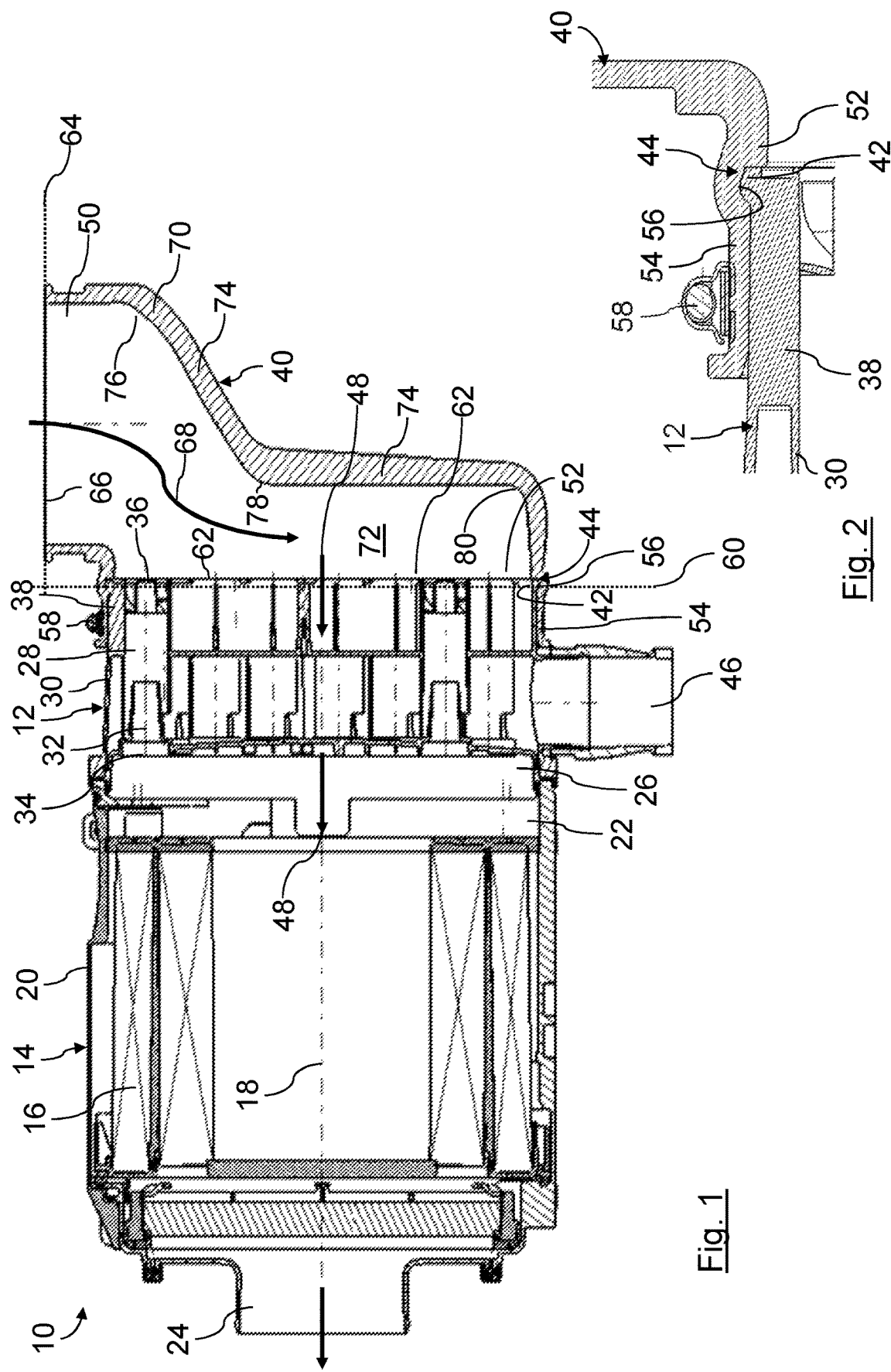

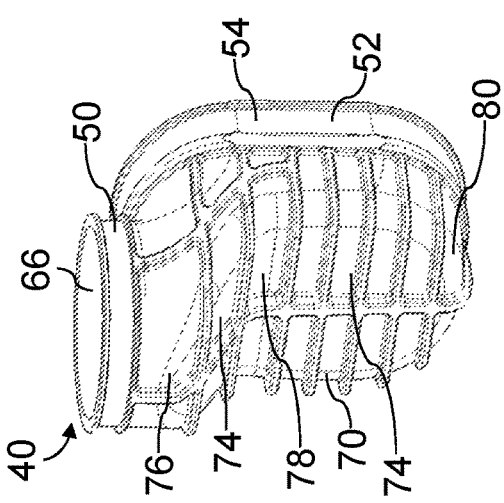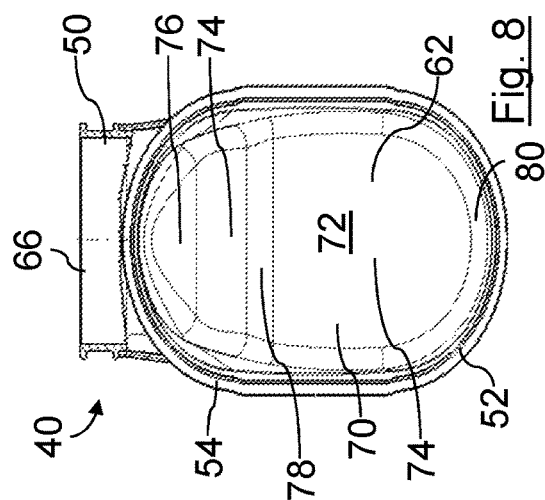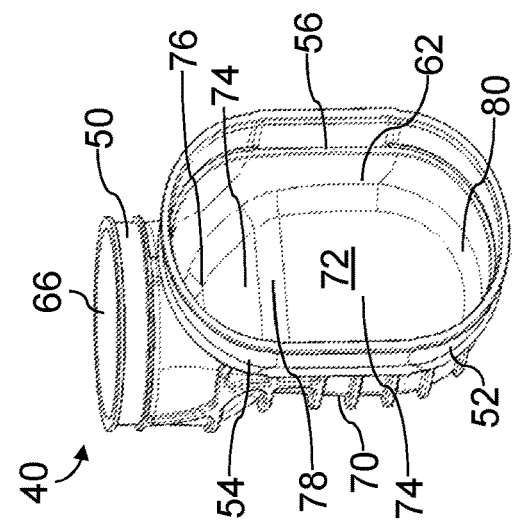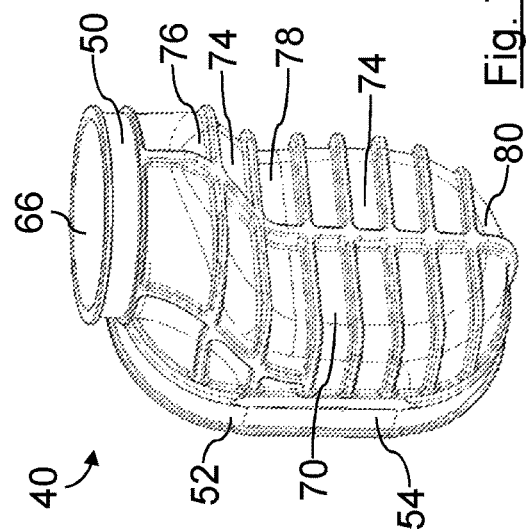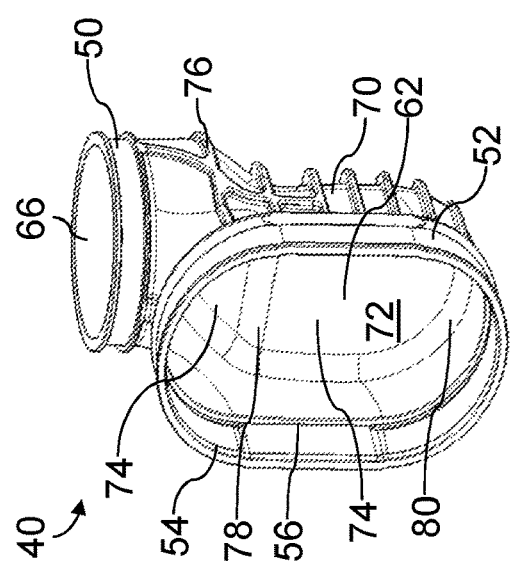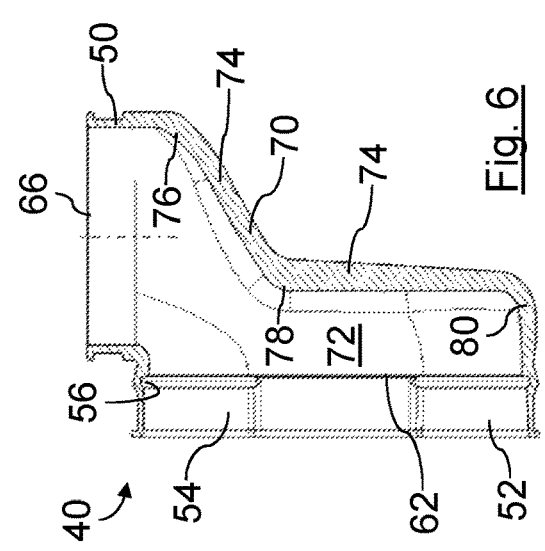

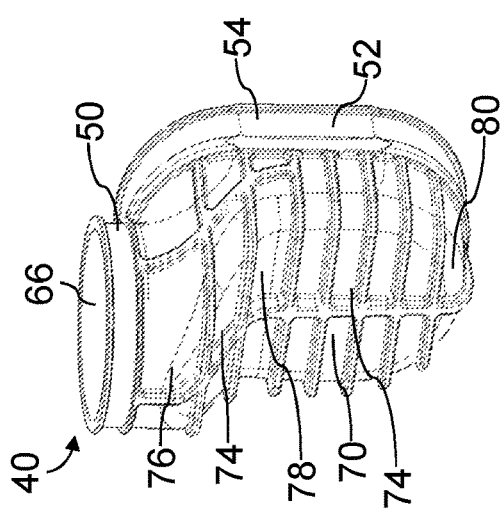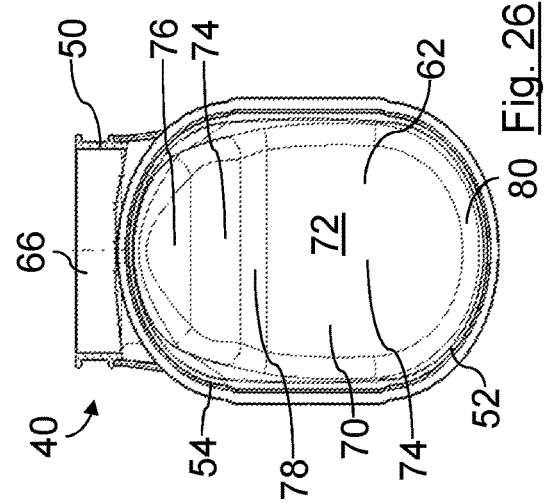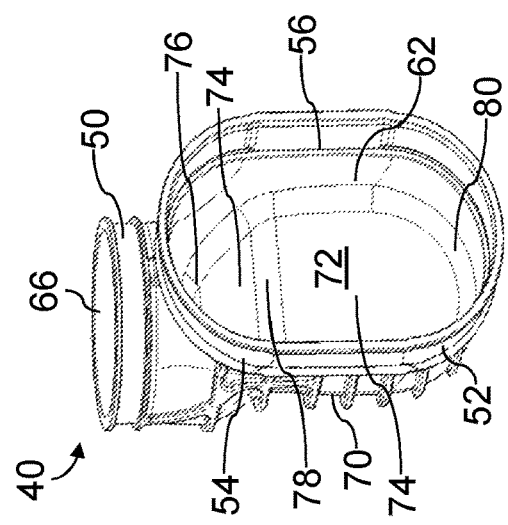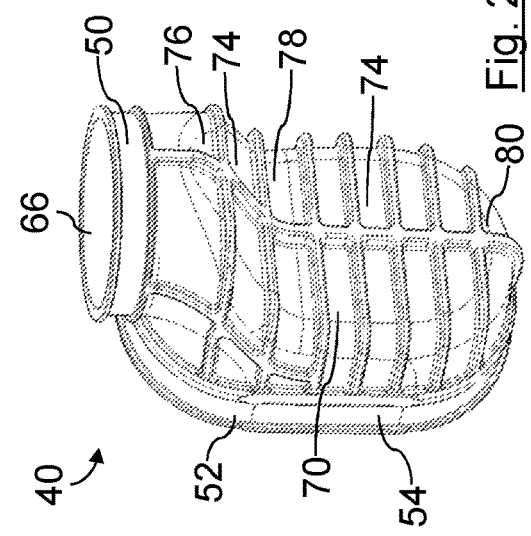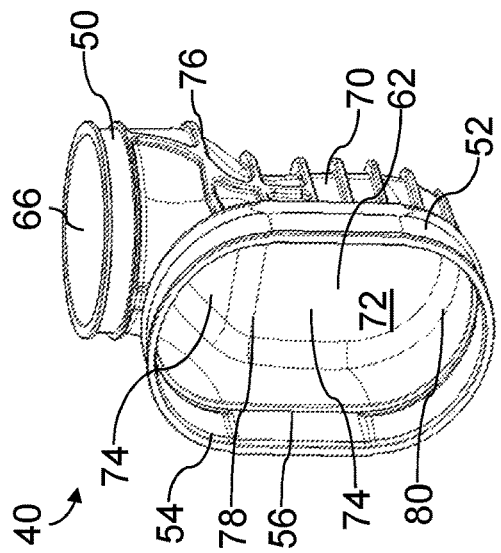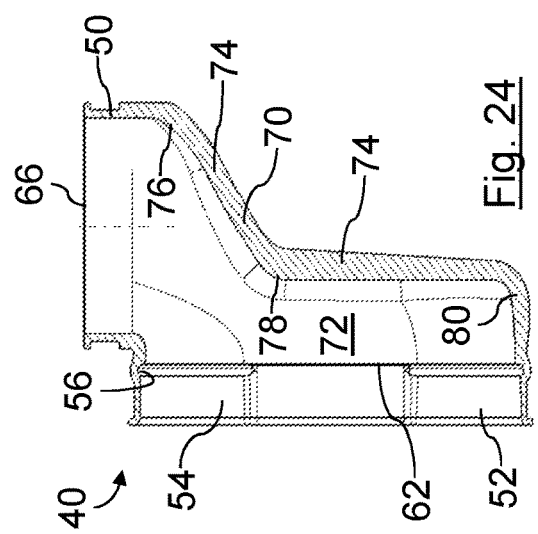

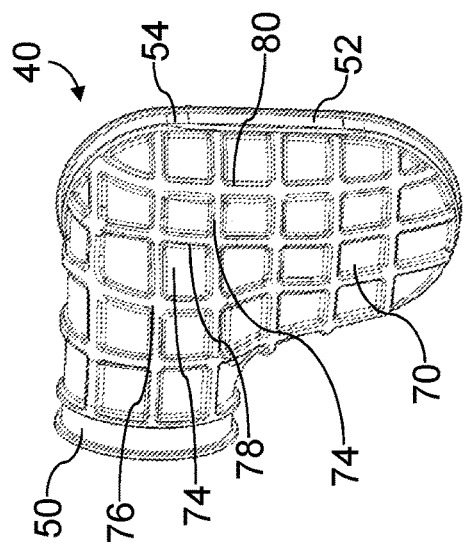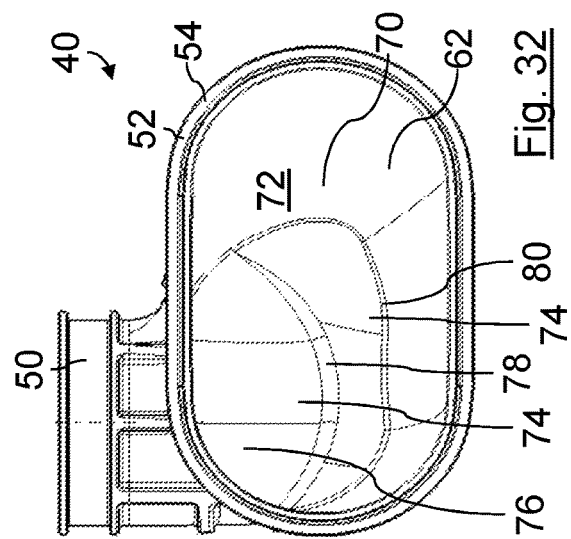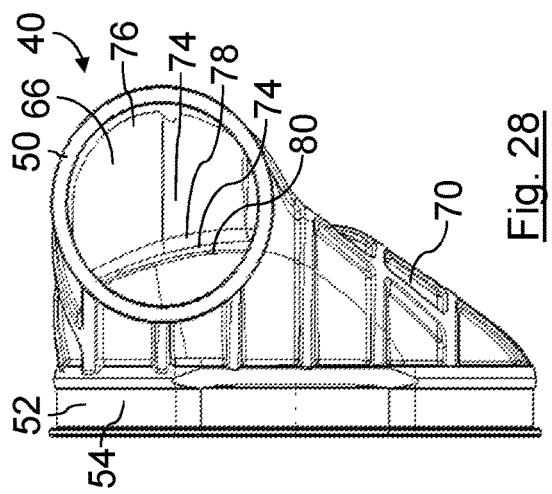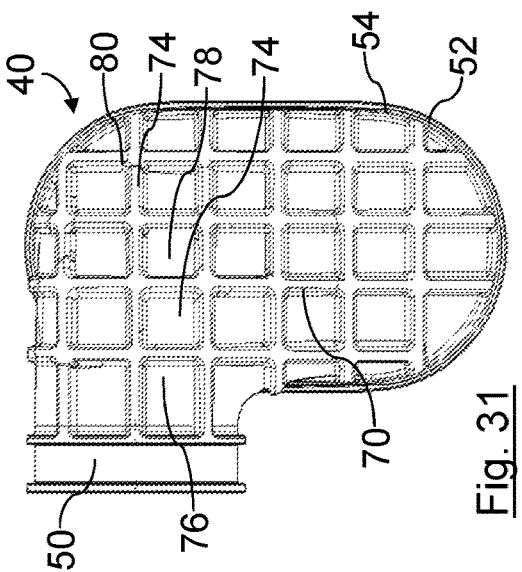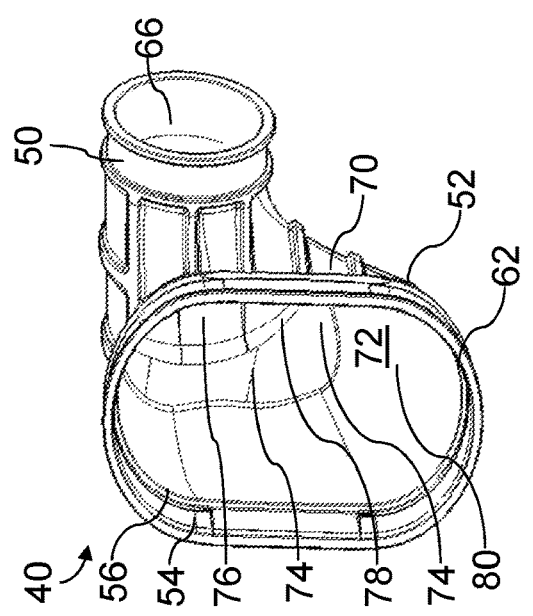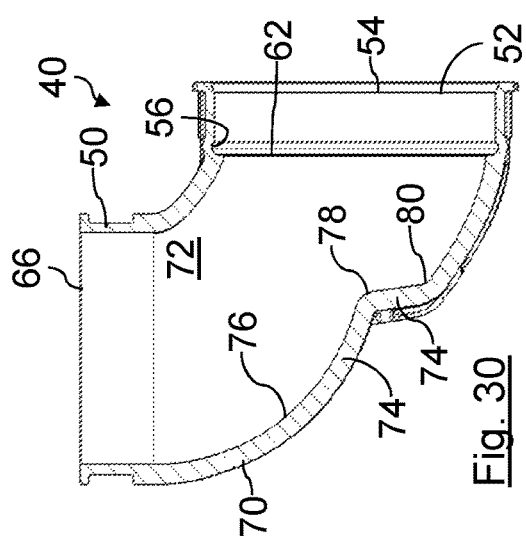

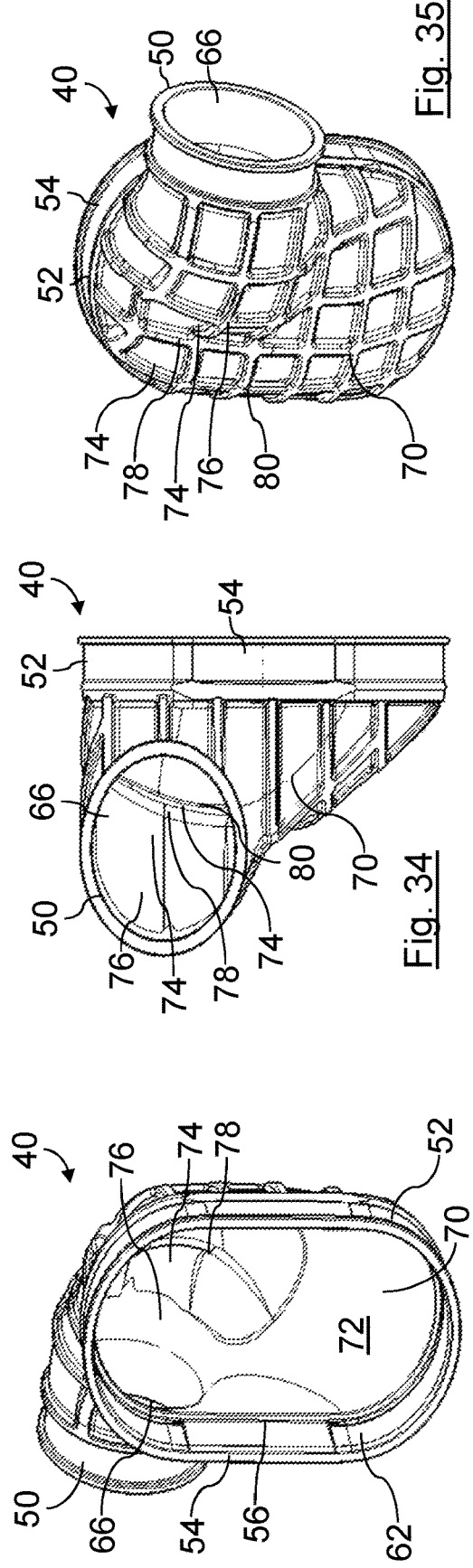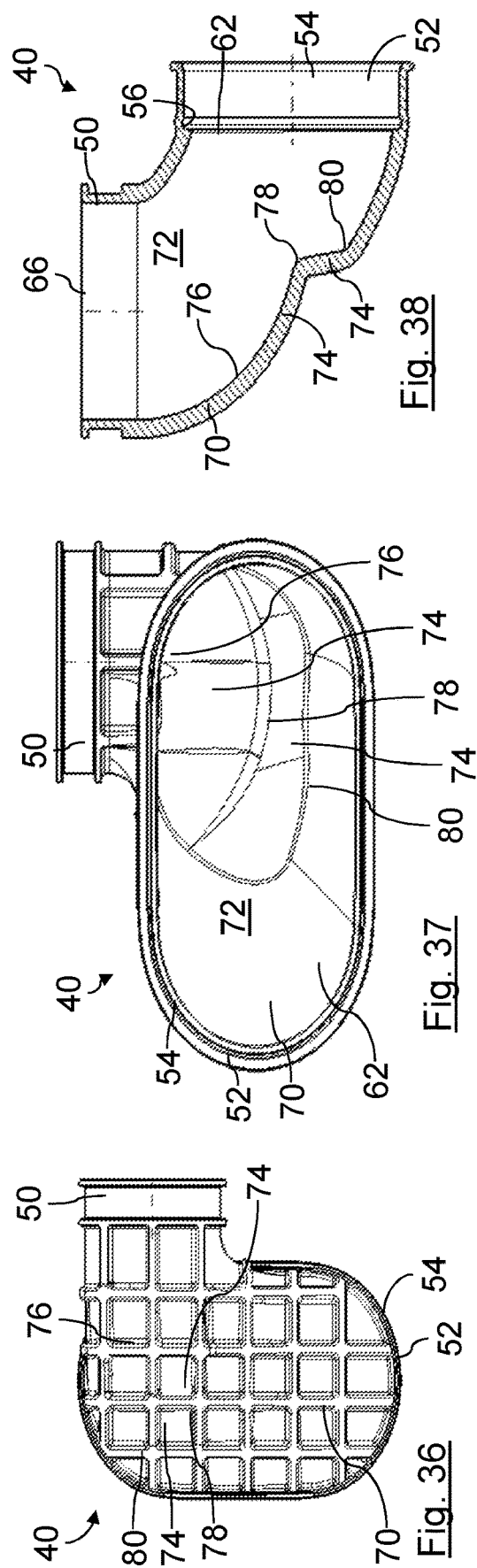

HOOD OF A MULTI CYCLONE BLOCK OF AN AIR CLEANER AND AIR CLEANER

CROSS REFERENCE TO RELATED APPLICATIONS

This Application is a continuation of U.S. application Ser. No. 14/725,813, filed 29 May 2015, now U.S. Pat. No. 9,745,924 B2, issued 29 Aug. 2017.

TECHNICAL FIELD

The present invention relates to a hood of a multi cyclone block, in particular an in-line multi cyclone block, of an air cleaner of an intake system of an internal combustion engine in particular of a motor vehicle, wherein the cyclone block is comprising a plurality of cyclone cells, wherein the hood having at least one hood-inlet and at least one hood-outlet for air to be fed to the cyclone cells.

The invention further relates to an air cleaner of an intake system of an internal combustion engine in particular of a motor vehicle, wherein the air cleaner having at least one multi cyclone block, in particular at least one in-line multi cyclone block, wherein the at least one cyclone block comprising a plurality of cyclone cells and a hood, wherein the hood having at least one hood-inlet and at least one hood-outlet for air to be fed to the cyclone cells and the at least one hood-outlet is connected air-ducting with the cell-inlets of the cyclone cells.

BACKGROUND

A multi cyclone block of an air cleaner known from the market has a plurality of cyclone cells. Each cyclone cell has a cell-inlet, where the raw air streams in a hood having at a hood-inlet and a hood-outlet for the air to be cleaned. The hood is connected air-ducting with the cell-inlets by the hood-outlet. The cyclone cells separate particles from the air to be cleaned. The separated particles being collected in the cyclone block. The collected particles must be removed from the cyclone block at regular maintenance intervals. Therefore, a scavenging system is required. Such hoods are also sometimes referred to as cowls.

It is an object of the invention to provide a hood and an air cleaner of the above-mentioned kind, where a pre-separation efficiency (PSE) for particles can be improved and/or a maintenance interval can be extended and/or a maintenance can be simplified.

SUMMARY OF THE DISCLOSURE

It is an object of the invention to provide a hood and an air cleaner of the above-mentioned kind, where a pre-separation efficiency (PSE) for particles can be improved and/or a maintenance interval can be extended and/or a maintenance can be simplified.

The object is achieved by that the at least one hood-outlet is designed for covering, in particular for surrounding, a plurality of cell-inlets, in particular all cell-inlets, of the cyclone cells of the cyclone block such that a fluid tight connection is provided between the hood and the cyclone cell inlets. A wall of the hood defines a distributor volume inside the hood, which is located between the at least one hood-inlet and the at least one hood-outlet, and wherein the wall includes at least one point of inflection, in particular at least one line or area of inflection, where at least one inner surface of the wall changes its curvature.

According to the invention, at the at least one point of inflection at least the inner surface of the wall changes from being concave to convex or vice versa. Thus, the shape of the distributor volume has at least one according concavity or convexity. Such concavities and convexities influence the airflow in the hood. The in-coming raw air will be guided by use of the inventive shape of the wall of the hood. The raw air is the air to be cleaned by the air cleaner, in particular by the cyclone block. The hood can be mounted on the inlet side for air of the cyclone block. The incoming air will be uniformly distributed and supplied to the cyclone cells by the hood. In the cyclone cells particles, in particular dust, will be separated from the raw air. The separated particles will be collected in the cyclone block and can be removed at regular maintenance intervals or if necessary. The removing of the collected particles is necessary for maintaining the pre-separation efficiency of the cyclone block. For removing the collected particles, a process of scavenging can be used.

Favorably, the wall can comprise at least one line of inflection and/or at least one area of inflection. The at least one line of inflection and/or the at least one area of inflection can be defined by multiple points of inflection each.

With the inventive hood, the pre-separation from the raw air can be improved. The pre-separation efficiency of the cyclone block can be improved. Additionally, the cyclone cells can be loaded more uniformly with separated particles. So, a maintenance interval of the cyclone block can be extended. In particular, a frequency of scavenging the cyclone cells can be reduced. Favorably, scavenging can become obsolete. Accordingly, a scavenging system for the cyclone block can be simpler or become obsolete. With an inventive hood with a special designed shape connected to a cyclone block of an air cleaner a pre-separation efficiency up to 80% and more can be achieved without the need of scavenging.

Favorably, the hood can be designed to guide the raw air to the plurality of cell-inlets of the cyclone block. The cell-inlets can define a multi direction inlet of the cyclone block. The hood can be flexible designed to supply the raw air in the multi direction inlet.

With its inventive design, the hood is suitable for use in confined spaces.

Favorably, an air duct or air hose can be connected to the at least one hood-inlet of the hood. The at least one air duct or air hose can lead to a suction place for the raw air which can be distant from the multi cyclone block, in particular the air cleaner.

Favorably, downstream of the multi cyclone block, at least one air filter of the air cleaner with at least one air filter element can be arranged in the flow-way of the air to be cleaned. With the at least one air filter element the air can be filtered.

A cyclone outlet of the cyclone block for air can be connected to an filter inlet for air of a filter housing of the at least one air filter. The cyclone outlet of the cyclone block can be connected air-ducting to cell-outlets of the cyclone cells and/or the cell-outlets can define the cyclone outlet.

Favorably, the multi cyclone block and the at least one air filter can be arranged in-line. So, a main flow-way of the air between the cyclone outlet of the multi cyclone block and the filter inlet of the at least one air filter can be straight. In this case, the multi cyclone block can be termed in-line multi cyclone block. An in-line multi cyclone block can be arranged space-saving.

The invention can be used with an intake system of an internal combustion engine of a motor vehicle. The invention can also be used in a technical area beyond automotive engineering. In particular, the invention can be used with industrial engines.

According to a favorable embodiment of the invention, at least the inner surface of the wall of the hood at least in direction from the at least one hood-inlet to the at least one hood-outlet includes multiple curves so that a main flow path for air in the hood can be curved multiple, in particular at least the inner surface of the wall and/or the main flow path may have a S-shaped profile. In this way, the uniform distribution of the raw air can be further improved. Further, the at least one hood-inlet and the at least one hood-outlet can be arranged staggered. So, the multi cyclone block, in particular the air cleaner, can be arranged more flexible particularly in constricted and/or in narrow and winding installation spaces, particularly in an engine compartment.

According to a further favorable embodiment of the invention, a plane with a flow cross-section on the inlet side of the at least one hood-inlet can be inclined to a plane with a flow cross-section on the outlet side of the at least one hood-outlet, in particular said plane of the at least one hood-inlet can be perpendicular to said plane of the at least one hood-outlet. In this way, a main flow direction of the raw air on the inlet side of the hood-inlet can be inclined to a main flow direction of the raw air on the outlet side of the hood-outlet. So, the cyclone block with the hood can be arranged more space-saving and/or more flexible in constricted and/or in narrow and winding installation spaces. A possible air duct or air hose can be inclined to a main flow path of the air in the cyclone block.

Favorably, said planes can be perpendicular. In this way, the main flow directions also can be perpendicular. In case of an in-line multi cyclone block, the main flow-way of the intake air can be perpendicular to an axis of the cyclone block, in particular of the air cleaner.

According to a further favorable embodiment of the invention, a flow cross-section of the at least one hood-inlet can be smaller than a flow cross-section of the at least one hood-outlet. In this way, the hood can act as a kind of adapter between a possible air duct or air hose on the side of the at least one hood-inlet and a connection of the cyclone block on the side of the at least one hood-outlet. An according connection section of the cyclone block can be larger than the possible air duct or the air hose.

According to a further favorable embodiment of the invention, a profile of a flow cross-section of the at least one hood-inlet can be different or equal to a profile of a flow cross-section of the at least one hood-outlet, in particular the profile of the at least one hood-inlet can be round or oval and the profile of the at least one hood-outlet can be oval or round.

Favorably, the hood-inlet can be designed as a connection to an air hose or an air duct. The connection side of the possible air hose or air duct can have a profile different to the profile of the inlet side of the cyclone block. So, the hood can be connected with the hood-inlet to a respective air duct or air hose. On the other hand, the hood can be connected with the hood-outlet to the inlet side of the cyclone block.

Favorably, the at least one hood-inlet can be round. So, it can be connected to a round connection side of the possible air duct or air hose. Alternatively, the at least one hood-inlet can be oval.

Favorably, the at least one hood-outlet can be oval. So, it can be connected to an oval connection side of the cyclone box. Thus, the hood can be used in combination with a flat cyclone box. Alternatively, the at least one hood-outlet can be round.

The hood can combine the advantages of a connection with the profile, in particular a round profile, of an air hose or air duct on one hand and the profile, in particular an oval profile, assembled to the cyclone block on the other hand.

According to a further favorable embodiment of the invention, the at least one hood-inlet can be arranged on a short side or on a long side of an oblong hood-outlet.

If the at least one hood-inlet is on the short side of the hood-outlet, the extent of the cyclone block with the hood can be reduced in direction of the short side, in particular in direction of a short minor axis of an oval hood-outlet.

If the at least one hood-inlet is on the long side of the hood-outlet, the extent of the cyclone block with the hood can be reduced in direction of the long side, in particular in direction of a long principle axis of an oval hood-outlet.

According to a further favorable embodiment of the invention, the hood can be asymmetrical regarding to a center axis of the at least one hood-outlet. So, an uniform distribution of the separated particles over the cyclone cells can be further improved. Further, the hood so can easier be adapted to an available installation space.

Favorably, the hood can be at least partly flexible, in particular elastic. So, the hood can compensate operational tolerances and/or vibrations. Additionally, a mounting and installation can be simplified.

According to a further favorable embodiment of the invention, the hood can comprise or consist of rubber, favorably synthetic rubber, in particular ethylene-propylene-diene-polymethylene. The hood can easy be formed of rubber, particularly synthetic rubber, in particular by use of an injection (die) molding technique or a casting method.

Favorably, the synthetic rubber can comprise or consist of ethylene-propylene-diene-polymethylene (EPDM) can be used.

Rubber, particularly synthetic rubber, can be flexible, in particular elastic.

As an alternative, the hood can comprise or consist of injection molded plastic, especially polyethylene, polyester, polyamide or similar. The injection molded plastic can comprise carbon or glass fiber for added rigidity in an amount up to 50 weight-%.

According to a further favorable embodiment of the invention, the at least one hood-outlet can comprise a connection section for connection with a corresponding connection section on an inlet side of the cyclone block. With the connection section, the hood can easy be connected to the cyclone block.

Favorably, the at least one hood-outlet can comprise or consist of a cylindrical sleeve. The at least one hood-outlet can be plugged on or in the connection section of the housing of the cyclone block.

A cylindrical connection section of the hood-outlet can surround the plurality of cell-inlets of the cyclone block.

According to a further favorable embodiment of the invention, the hood can comprise at least one means, in particular at least one snap-fit and/or at least one hose clamp, for fastening the hood on/in/at the cyclone block in particular on the side of the at least one hood-outlet. With the at least one means for fastening the hood can be fixed on the cyclone block.

Favorably, at least one means for fastening can comprise or consist of at least one snap-fit. One part of the at least one snap-fit can comprise or consist of at least one notch on the side of the hood. The at least one notch can be combined with a possible cylindrical connection section of the at least one hood-outlet. At least one according collar can be located on side of the cyclone block. The at least one collar can latch in the at least one notch for fastening the hood on the cyclone block. Alternatively or additionally at least one collar can be arranged on the side of the hood and at least one corresponding notch can be arranged on side of the cyclone block.

Favorably, alternatively or additionally, at least one means of fastening can have or consist at least one hose clamp. The at least one hose clamp can be combined with a possible cylindrical connection section of the at least one hood-outlet. If the cylindrical connection section is plugged on the according connection section of the cyclone block, the at least one hose clamp can clasp the cylindrical connection section of the hood and press it against the according connection section of the cyclone block. So, a tightness and/or stability of the connection between the hood and the cyclone block can be improved. Alternatively, the possible cylindrical connection section of the hood can be plugged in an according connection section of the cyclone block. In this case, the at least one hose clamp can clasp the connection section of the cyclone block accordingly.

The object further is achieved by the air cleaner in that the at least one hood-outlet is designed for covering, in particular for surrounding, a plurality of cell-inlets, in particular all cell-inlets, of the cyclone cells of the cyclone block, wherein a wall of the hood is defining a distributor volume inside the hood, which is located between the at least one hood-inlet and the at least one hood-outlet, and wherein the wall comprises at least one point of inflection, in particular at least one line or area of inflection, where at least one inner surface of the wall changes its curvature.

The above-mentioned advantages and characteristic features of the inventive hood apply analogously to the inventive air cleaner and its favorable embodiments and vice versa.

BRIEF DESCRIPTION OF DRAWINGS

The present invention together with the above-mentioned and other objects and advantages may best be understood from the following detailed description of the embodiments, but not restricted to the embodiments, wherein is shown schematically FIG. 1 a longitudinal section of an air cleaner with an in-line multi cyclone block, comprising a hood according to a first embodiment, which is connected to a cyclone inlet of the cyclone block;

FIG. 2 a detailed view of a connection of the hood with the cyclone block of FIG. 1;

FIG. 3 to 5 a perspective view of the hood of FIGS. 1 and 2;

FIG. 6 a longitudinal section of the hood of FIGS. 1 and 2;

FIG. 7 a perspective view of the hood of FIGS. 1 and 2;

FIG. 8 a view looking into the hood outlet of the hood of FIGS. 1 and 2;

FIG. 21, 22, 26 view looking into the hood outlet of a fourth embodiment of the hood of FIGS. 1 and 2;

FIG. 23, 25 perspective views of the hood of FIGS. 21, 22, 26;

FIG. 24 a longitudinal section of the hood of FIGS. 21, 22, 26;

FIG. 27, 32 view looking into the hood outlet of a fifth embodiment of the hood of FIGS. 1 and 2;

FIG. 28, 29,31 perspective views of the hood of FIGS. 27, 32;

FIG. 30 a longitudinal section of the hood of FIGS. 27, 32;

FIG. 33, 37 view looking into the hood outlet of a sixth embodiment of the hood of FIGS. 1 and 2;

FIG. 34, 35, 36 perspective views of the hood of FIGS. 33, 37; and

FIG. 38 a longitudinal section of the hood of FIGS. 33, 37.

Figure 11:
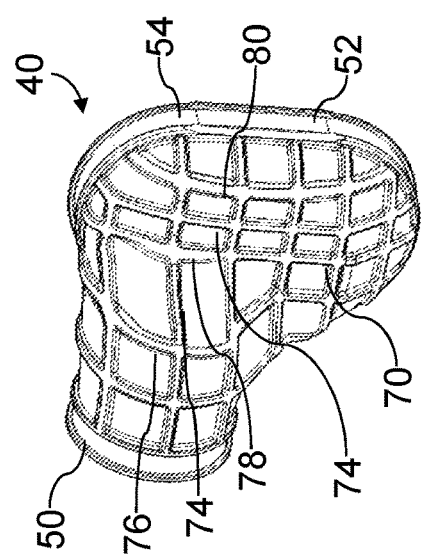
FIG. 11, 13 perspective views of the hood of FIGS. 9, 10, 14.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention. Further, the drawings are not true to scale.

DETAILED DESCRIPTION

In FIG. 1 an air cleaner 10 is shown in a longitudinal section. The air cleaner 10 is designed for the cleaning of combustion air of an internal combustion engine of a motor vehicle. The air cleaner 10 is arranged in an air intake system of the internal combustion engine.

The air cleaner 10 has a pre-separator in form of an in-line multi cyclone block 12 and an air filter 14 with an air filter element 16. The air cleaner 10 is designed as an in-line system, which means that the cyclone block 12 and the air filter 14 are arranged in-line relating to a main axis 18.

The air filter 14 has a filter housing 20 with a filter inlet 22 for the air to be filtered and a filter outlet 24 for the filtered air. The filter outlet 24 and the filter inlet 22 are on opposite sides of the filter housing 20. The filter outlet 24 and the filter inlet 22 are coaxial to the main axis 18 each. The air filter element 16 is arranged in the filter housing 20 between the filter inlet 22 and the filter outlet 24. The filter inlet 22 is connected to a cyclone outlet 26 of the cyclone block 12. The filter outlet 24 is connected to a not shown connection hose, which leads to the internal combustion engine.

The cyclone block 12 comprises a plurality of cyclone cells 28. The cyclone cells 28 are functionality parallel arranged in a frame 30 of the cyclone block 12. Respective axis 32 of the cyclone cells 28 are parallel to the main axis 18. Cell-outlets 34 define the cyclone outlet 26. The cell-outlets 34 are connected air-ducting to the filter inlet 22.

Cell-inlets 36 are on the opposite side of the cell-outlets 34 regarding to the main axis 18. The cell-inlets 36 are surrounded by a connection section 38 of the frame 30. The connection section 38 of the frame 30 is designed for connecting with a hood 40 of the cyclone block 12. The radial outer surface of the connection section 38 of the frame 30 is oval cylindrical and coaxial to the main axis 18. A detailed view of the connection of the hood 40 with the frame 30 is shown in FIG. 2. The hood 40 is depicted in different views in FIGS. 3 to 8.

Near its free edge, which is on the axial opposite side of the air cleaner 10, the connection section 38 has a collar 42. The collar 42 is coaxial to the main axis 18. The collar 42 extends in radial direction respective to the main axis 18.

The collar 42 is part of a snap-fit 44, which is a first means for fastening the hood 40 on the frame 30 of the cyclone block 12.

A dust discharge 46 leads through a side wall of the frame 30. In the normal operating orientation, which is shown in FIG. 1, the dust discharge 46 is on the underside of the cyclone block 12. Particles separated from the air can be collected at the bottom of the frame 30 and can be removed through the dust discharge 46.

In FIG. 1 a main flow path of the air to be cleaned through the cyclone block 12 is depicted with straight arrows 48. The main flow path 48 through the cyclone block 12 is parallel to the main axis 18.

The hood 40 is made of synthetic rubber, namely ethylene-propylene-diene-polymethylene. The hood 40 has a hood-inlet 50 and a hood-outlet 52 for air to be fed to the cyclone cells 28.

The hood-outlet 52 is oval cylindrical and coaxial to the main axis 18. In the described embodiment, the main axis 18 coincides with a center axis of the hood-outlet 52.

A part of the hood-outlet 52 realizes a connection section 54 for connecting with the connection section 38 of the frame 30. The connection section 54 is on the side of the hood-outlet 52 which is opposite to the hood-inlet 50 in regard to an air flow direction through the hood 40. In the completed air cleaner 10, the connection section 54 is facing toward the cyclone block 12.

The connection section 54 has a notch 56 on the side facing the hood-inlet 50. In the completed air cleaner 10, the notch 56 is on the far side of the cyclone cells 28. The notch 56 is regarding to the main axis 18 coaxial arranged on the radial inner circumferential side of the connection section 54. The notch 56 is part of the snap-fit 44. It is corresponding to the collar 42 of the connection section 38 of the frame 30.

The hood 40 further comprises a hose clamp 58 as a second means for fastening the hood 40 on the cyclone block 12. The hose clamp 58 is arranged on the radial outer circumferential side of the connection section 54 of the hood-outlet 52. In the completed air cleaner 10, the hose clamp 58 presses the connection section 54 of the hood-outlet 52 against the connection section 38 of the frame 30.

On the side of the connection section 54 which is facing the hood-inlet 50, a plane 60 with a flow cross-section 62 of the hood-outlet 52 is defined. The plane 60 is perpendicular to the main axis 18 and to a flow path 48 on the outlet side of the hood-outlet 52. The profile of the flow cross-section 62 of the hood-outlet 52 is oval.

The hood-inlet 50 is on a short side of the oblong hood-outlet 52. In all, the hood 40 is asymmetrical regarding to the center axis of the hood-outlet 52, namely the main axis 18. In the completed air cleaner 10, the hood-inlet 50 is on the opposite side of the dust discharge 46 of the cyclone block 12. In the normal operating orientation, the hood-inlet 50 is on the upper side of the hood 40.

A plane 64 with a flow cross-section 66 of the hood-inlet 50 is perpendicular to the flow path 68 of the air on the inlet side. In FIG. 1, the main flow path 68 in the hood 40 is indicated with a curved arrow. Said plane 64 of the hood-inlet 50 is inclined to the plane 60 with the flow cross-section 62 on the outlet side of the hood-outlet 52. Said plane 64 of the hood-inlet 50 is perpendicular to said plane 60 of the hood-outlet 52.

A profile of the flow cross-section 66 of the hood-inlet 50 is different to the profile of the flow cross-section 62 of the hood-outlet 52. The profile of the hood-inlet 50 is round. The flow cross-section 66 of the hood-inlet 50 is smaller than the flow cross-section 62 of the hood-outlet 52.

A wall 70 of the hood 40 is defining a distributor volume 72 inside the hood 40. The distributor volume 72 is arranged between the hood-inlet 50 and the hood-outlet 52. In the distributor volume 72, the air to be cleaned is uniformly distributed over all cell-inlets 36.

The wall 70 comprises two areas of inflection 74 where the inner surface of the wall 70 changes its curvature. Each area of inflection 74 is defined by multiple points of inflection.

The inner surface of the wall 70 of the hood 40 in a flow-direction from the hood-inlet 50 to the one hood-outlet 52 this curved multiple. Starting from the hood-inlet 50, the inner surface of the wall 70 on the opposite side of the hood-inlet 50 has a first concavity 76, a first area of inflection 74, a convexity 78, a second area of deflection 74 and a second concavity 80. The main flow path 68 for air in the hood 40 is curved multiple. The inner surface of the wall 70 and the main flow path 68 have an S-shaped profile each. This is shown for example in FIGS. 1 and 6.

For assembling the air cleaner 10, the cyclone block 12 being connected with its outlet side to the inlet side of the housing 20 of the air filter 14.

The connection section 38 of the frame 30 of the cyclone block 12 being plugged into the connection section 54 of the hood-outlet 52 of the hood 40. In the correct mounting position, the collar 42 of the connection section 38 of the frame 30 snaps into the notch 56 of the connection section 54 of the hood 40. The hose clamp 58 being mounted on the outer circumferential side of the connection section 54 of the hood 40. The hood-outlet 52 so is connected air-ducting with the cell-inlets 36 of the cyclone cells 28. The hood-outlet 52 is surrounding all cell-inlets 36 of the cyclone cells 28 of the cyclone block 12.

The air filter element 16 being arranged in the housing 20 of the air filter 14. The housing 20 being closed.

The filter outlet 24 of the air cleaner 10 being connected to the connection hose of the internal combustion engine. The hood-inlet 50 of the hood 40 being connected with the air hose, which leads to the suction place.

Figure 14:
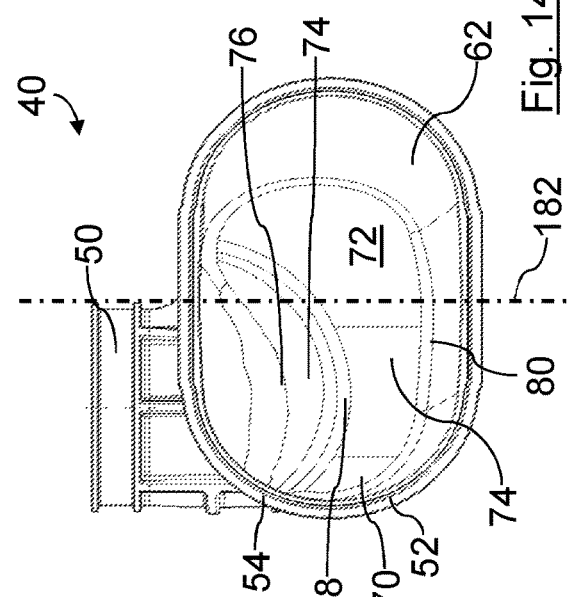
Figure 10:
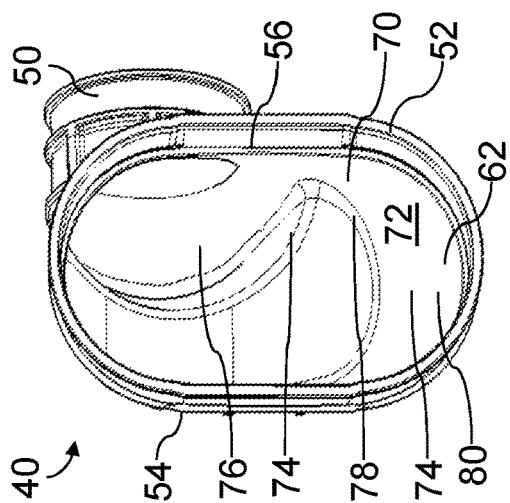
Figure 13:
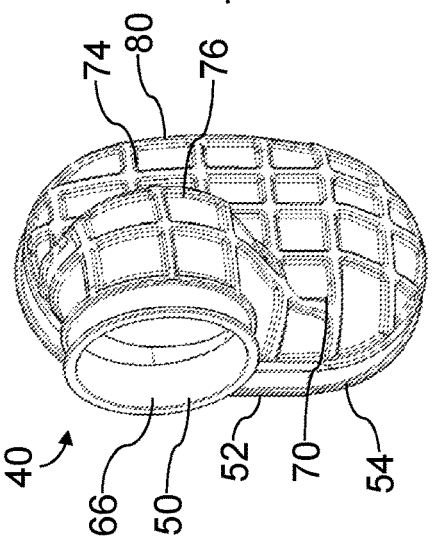
Figure 9:
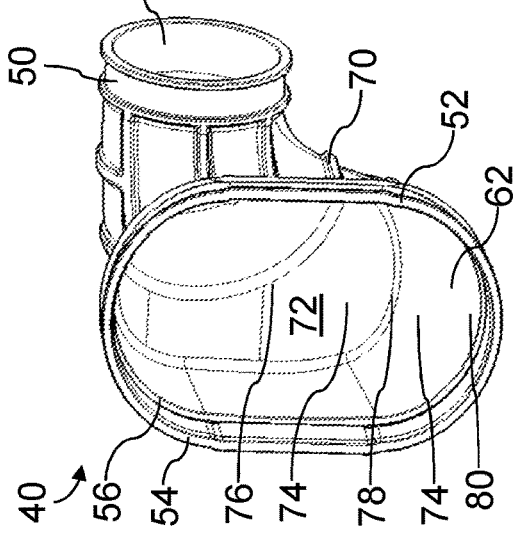
FIG. 9, 10, 14 view looking into the hood outlet of a second embodiment of the hood of FIGS. 1 and 2.
Figure 12:
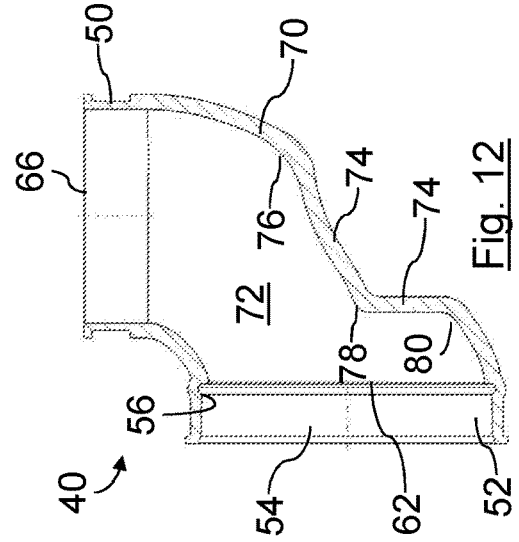
FIG. 12 a longitudinal section of the hood of FIGS. 9, 10, 14.
Figure 15:
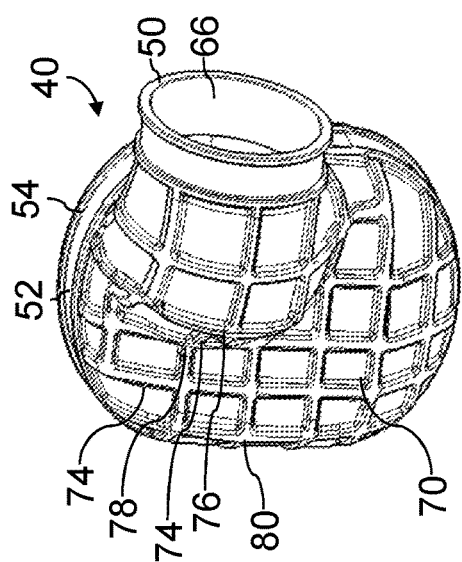
FIG. 15, 16, 19 view looking into the hood outlet of a third embodiment of the hood of FIGS. 1 and 2.
Figure 16:
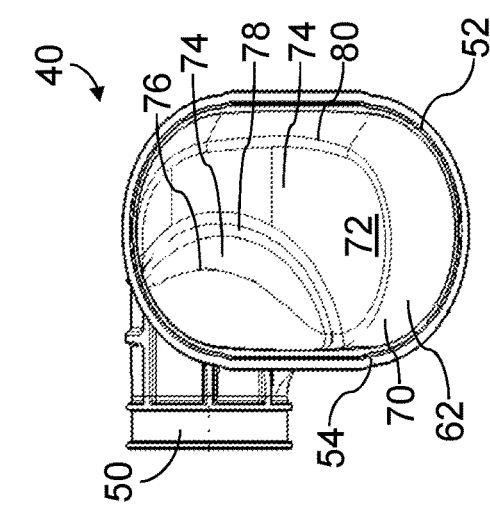
Figure 17:
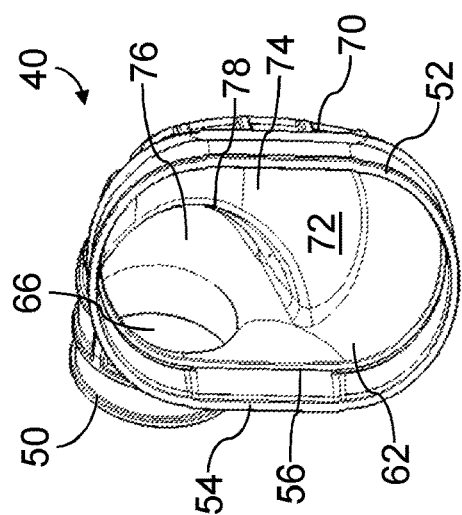
FIG. 17, 18 perspective views of the hood of FIGS. 15, 16, 19.

FIGS. 9 to 14 depict a second embodiment of a hood 40. Those parts which are equal to those of the first embodiment according to FIGS. 1 to 8 have the same reference numbers. Different to the first embodiment, according to the second embodiment the hood-inlet 50 is on a long side of the oblong hood-outlet 52. The hood-inlet 50 is sideways of a short minor axis 182 of the oval hood-outlet 52. The short minor axis 182 of the hood-outlet 52 is shown in FIG. 14. In the normal working orientation of the hood 40, which is shown for example in FIGS. 9 to 11, the hood-inlet 50 is approximately on a level with the upper half of the long side of the hood-outlet 52.

FIGS. 15 to 20 depict a third embodiment of a hood 40. Those parts which are equal to those of the second embodiment according to FIGS. 9 to 14 have the same reference numbers. Different to the second embodiment, according to the third embodiment the hood-inlet 50 is on the opposite long side of the oblong hood-outlet 52.

Figure 18:
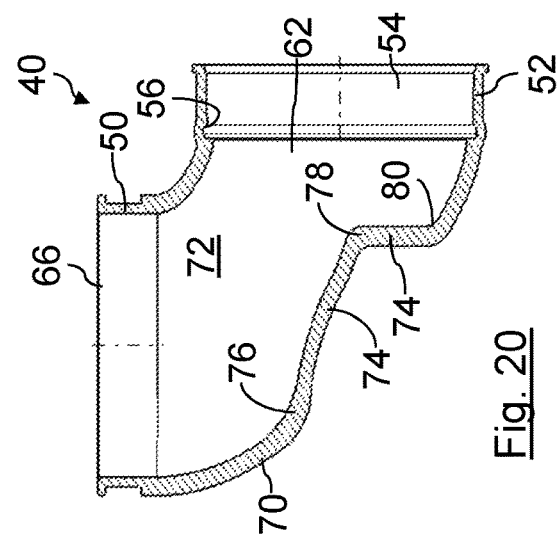
Figure 19:
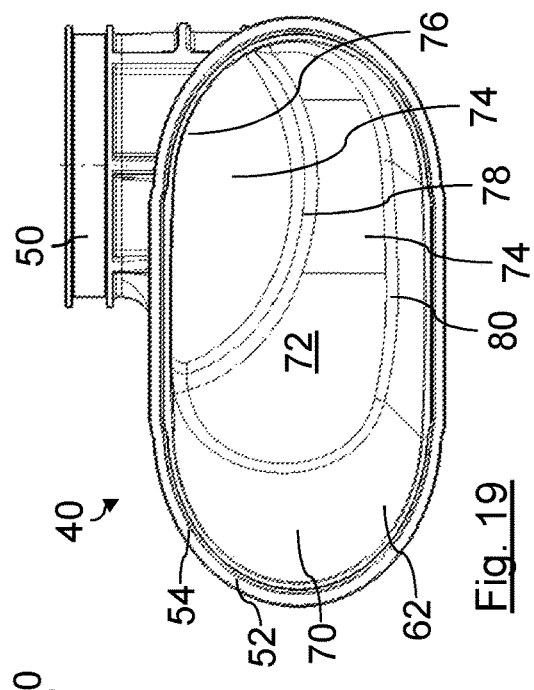
Figure 20:
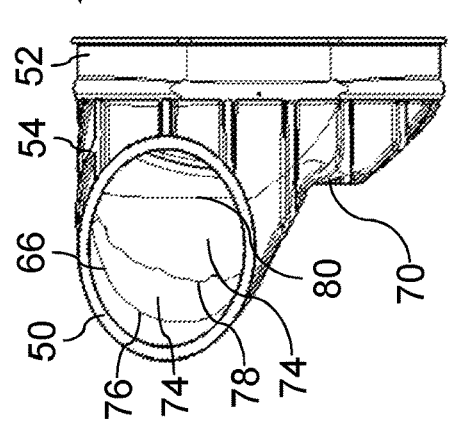
FIG. 20 a longitudinal section of the hood of FIGS. 15, 16, 19.

Further, the profile of the hood-inlet 50 of the third embodiment is oval, as shown in FIG. 18. The short minor axis of the oval hood-inlet 50 is parallel to the long principal axis of the oval hood-outlet 52.

FIGS. 21 to 26 depict a fourth embodiment of a hood 40. Those parts which are equal to those of the first embodiment according to FIGS. 1 to 8 have the same reference numbers.

FIGS. 27 to 32 depict a fifth embodiment of a hood 40. Those parts which are equal to those of the second embodiment according to FIGS. 9 to 14 have the same reference numbers. Different to the second embodiment, according to the fifth embodiment the two areas of inflection 74 where the inner surface of the wall 70 changes its curvature are closer to each other. Further, the profile of the hood-inlet 50 of the fourth embodiment is round, which is shown in FIG. 28.

FIGS. 33 to 38 depict a sixth embodiment of a hood 40. Those parts which are equal to those of the fifth embodiment according to FIGS. 27 to 32 have the same reference numbers. Different to the fifth embodiment, according to the sixth embodiment the hood-inlet 50 is on the opposite long side of the oblong hood-outlet 52.

Further, the profile of the hood-inlet 50 of the sixth embodiment is oval, as shown in FIG. 34. The short minor axis of the oval hood-inlet 50 is parallel to the long principal axis of the oval hood-outlet 52.

What is claimed is:

1. A hood of a multi-cyclone block of an air cleaner of an intake system of an internal combustion engine, wherein the multi-cyclone block includes a plurality of cyclone cells, the hood comprising:
   at least one hood-inlet;
   at least one hood-outlet for air to be fed into the plurality of cyclone cells;
      wherein the at least one hood-outlet surrounds a plurality of cyclone cell inlets of the plurality of cyclone cells of the cyclone block;
   a wall defining a distributor volume inside of the hood, the wall arranged between the at least one hood-inlet and the at least one hood-outlet;
   wherein an inner surface of the wall of the hood includes multiple curves on the at least the inner surface in a flow direction of a main flow path from the at least one hood-inlet to the at least one hood-outlet;
   wherein the inner surface of the wall has an S-shaped profile;
   wherein the S-shaped profile includes:
      a first concavity formed by the inner surface of the wall extending in the flow direction from the at least one hood-inlet in direction towards the at least one hood-outlet;
      a first convexity formed by the inner surface of the wall at an end of the first concavity;
      second concavity formed by the inner surface of the wall extending in the flow direction from an end of the first convexity towards the at least one hood-outlet;
      wherein the first concavity, first convexity and the second concavity connect to form a portion of the S-shaped profile;
   wherein the hood is formed of a synthetic rubber or molded plastic.

2. The hood according to claim 1, wherein
   the hood inlet at its inlet side defines a first plane and a first flow cross-section;
   wherein the hood at its outlet side defines a second plane and a second flow cross-section;
   wherein the first plane with the first flow cross-section on the inlet side of the at least one hood-inlet is inclined to the second plane with the second flow cross-section on the outlet side of the at least one hood-outlet.

3. The hood according to claim 1, wherein
   a first flow cross-section of the at least one hood-inlet is smaller than a second flow cross-section of the at least one hood-outlet.

4. The hood according to claim 2, wherein
   a profile of the first flow cross-section of the at least one hood-inlet is different or equal to a profile of second flow cross-section of the at least one hood-outlet;
   wherein the profile of the at least one hood-inlet is round or oval and the profile of the at least one hood-outlet is oval or round.

5. The hood according to claim 1, wherein
   the at least one hood-inlet is arranged on a short side or on a long side of an oblong hood-outlet.

6. The hood according to claim 2, wherein
   the hood is asymmetrical with respect to a center axis of the at least one hood-outlet, the center axis perpendicular to the second plane.

7. The hood according to claim 1, wherein
   the at least one hood-outlet has a connection section configured to connect onto a corresponding connection section on an inlet side of the cyclone block.

8. The hood according to claim 1, wherein
   the hood comprises a fastening member of at least one snap-fit and/or at least one hose clamp configured to fasten the at least one hood-outlet onto the cyclone block.

9. The hood according to claim 1, wherein
   the molded plastic comprises carbon fibers or glass fibers up to 50 percent by weight.

10. An air cleaner of an intake system of an internal combustion engine, wherein
    the air cleaner includes
       at least one multi cyclone block comprising a plurality of cyclone cells; and
       a hood;
    wherein the hood includes
       at least one hood-inlet connected to air-ducting air flow through an interior of the hood into a plurality of cyclone cell inlets of the plurality of cyclone cells;
       at least one hood-outlet conducting air into the cyclone cells;
          wherein the at least one hood-outlet surrounds a plurality of cyclone cell inlets of the plurality of cyclone cells of the cyclone block;
    wherein the hood includes a wall defining a distributor volume inside of the hood, the wall arranged between the at least one hood-inlet and the at least one hood-outlet; and
    wherein the wall includes at least one line or area of inflection where an inner surface of the wall changes its curvature;
    wherein the inner surface of the wall of the hood includes multiple curves on the at least the inner surface in a flow direction of a main flow path from the at least one hood-inlet to the at least one hood-outlet;
    wherein the inner surface of the wall has an S-shaped profile;
    wherein the S-shaped profile includes:
       a first concavity formed by the inner surface of the wall extending in the flow direction from the at least one hood-inlet in direction towards the at least one hood-outlet;
       a first convexity formed by the inner surface of the wall at an end of the first concavity;
       second concavity formed by the inner surface of the wall extending in the flow direction from an end of the first convexity towards the at least one hood-outlet;
       wherein the first concavity, first convexity and the second concavity connect to form a portion of the S-shaped profile;

wherein the hood is formed of a synthetic rubber or molded plastic.

11. The air cleaner according to claim 10, wherein
the plurality of cyclone cells on the cyclone block are arranged parallel to a central main axis of the filter, such that the plurality of cyclone cells and the air filter form an in-line system aligned on the central main axis;
wherein the hood-outlet includes a first connection section that radially surrounds and connects onto a radially outer surface of a mating second connection section of the cyclone block, the first connection section including:
 a radially outwardly projecting flange formed on a radially outer surface of the first connection section on a terminating end of the hood at the hood outlet;
 a circumferential notch formed into a radially inner surface of the first connection section and extending circumferentially around the central main axis,
 wherein the circumferential notch is receives and engages a radially outwardly projecting collar formed on the mating second connection section of the cyclone block;
a clamp retaining section arranged on the radially outer surface of the first connection section between the circumferential notch and the terminating end of the hood;
a hose clamp arranged on the clamp retaining section and compressing the first connection section of the hood-outlet onto the mating second connection section of the cyclone block.

12. The air cleaner according to claim 10, wherein
the molded plastic comprises carbon fibers or glass fibers up to 50 percent by weight.

\* \* \* \* \*